United States Patent [11] 3,632,448

[72] Inventor Morton Beltzer
 New York, N.Y.
[21] Appl. No. 748,193
[22] Filed July 29, 1968
[45] Patented Jan. 4, 1972
[73] Assignee Esso Research and Engineering Company

[54] ALUMINUM-HALOGEN SECONDARY BATTERY METHOD WITH MOLTEN ELECTROLYTE
 8 Claims, No Drawings

[52] U.S. Cl...................................................... 136/86 A, 136/20, 136/155
[51] Int. Cl......................................................H01m 29/04
[50] Field of Search............................................ 136/86, 155, 20

[56] References Cited
 UNITED STATES PATENTS
2,773,786 12/1956 Johe.............................. 136/155
2,921,110 1/1960 Crowley et al................. 136/86
2,924,634 2/1960 Fischbach et al............. 136/86
3,043,898 7/1962 Miller et al................... 136/86

OTHER REFERENCES

Technical Document Report, " Evaluation of Now Cathode-Anode Couples for Secondary Batteries," No. ASD–TDR– 62– 4 AD 277,197, Apr. 1962, pp. 1, 7, 8, 13, 24 & 30

ASTIA, AD 286,686, June 1962, " Third Status Report on Full Cells" by Hunger et al., pp. 1, 2, 16, 17, U.S. Army Signal R&D Lab.

Primary Examiner—Allen B. Curtis
Attorneys—Pearlman and Stahl and Robert I. Pearlman ABSTRACT: A secondary battery utilizing the aluminum-halogen couple having a fused salt electrolyte of aluminum halide and alkali metal halide, the halide ions corresponding to the halogen of the couple exhibits the advantages of high storage capacity and relatively low operating temperatures.

ALUMINUM-HALOGEN SECONDARY BATTERY METHOD WITH MOLTEN ELECTROLYTE

BACKGROUND OF THE INVENTION

1. Field of the Invention

This invention relates to high-energy-density secondary batteries utilizing the aluminum-halogen couple. More particularly, it is concerned with a secondary battery utilizing the aluminum-halogen couple having an electrically conductive fused salt electrolyte, the ions of which correspond to those produced by the cell discharge reaction which is able to operate at temperatures substantially lower than those batteries utilizing fused salt electrolytes now known to the art.

2. Description of the Prior Art

Secondary batteries, or voltaic cells, have been widely used for many years. The energy output of such cells is directly related to the anode-cathode couple, it being advantageous to employ those materials as electrodes which would produce the highest electromotive force. From a table of standard electrode potentials, it can be learned that a cell with a high electromotive force can be made by using couples of materials from the extreme ends of the table. For instance a cell utilizing a lithium chlorine couple has been investigated heavily because of the high E.M.F. produced.

As the more active metals of the electromotive series are employed as anodes and cathodes, the type of electrolyte used becomes more sophisticated. For example, the battery utilizing a highly active metal-halogen couple cannot usually utilize an aqueous electrolyte because of the irreversibility of the cell reaction. Solid electrolytes require high operating temperatures and are not usually highly conductive. Although organic electrolytes can be operated at ambient temperatures, their conductance is usually too low for such systems. The most suitable electrolytes for batteries utilizing the active metal-halogen couples are molten or fused salts. These materials invariably have high ionic conductivities and because of the variety of salt and salt mixtures, electrolyte systems can be utilized over a temperature range of 1,000° C. or more.

The use of molten or fused salts as electrolytes in secondary batteries has been known to the art. See U.S. Pat. Nos. 3,238,437; 3,132,971; 3,160,531; 3,120,456; 3,110,632; 3,099,587; 3,031,518 and the article "New Rechargeable Systems" by G. S. Lazier, pp. 80–82, 15th Annual Power Sources Conference Report (1961). Such a battery, sometimes known as a thermal cell, is an electrochemical power supply utilizing as the electrolyte an inorganic salt composition which is solid and nonconducting at ordinary temperatures. The cell is activated by heating it to a temperature sufficiently high to fuse or melt the electrolyte which thereby becomes conductive so that electrical energy may then be withdrawn.

The primary advantage of these types of secondary batteries is high energy storage and power output capabilities. Attendant disadvantages of these cells, however, are total overall weight of the battery, high operating temperatures and lowered voltage and coulombic efficiency due to self-discharge.

SUMMARY OF THE INVENTION

It has now been found that the aluminum-halogen couple in combination with a fused or molten salt of aluminum halide and alkali metal halide, the halide ion being the ion of the halogen part of the couple, forms a battery which does not require the high operating temperatures of similar batteries known to the art. Other advantageous of this battery include negligible self-discharge, low polarization and high discharge rates. The preferred halogen is chlorine, the preferred halide is chloride and the preferred alkali metals are sodium and potassium. Bromine and the bromide ion, as well as lithium, may, however, be employed as battery constituents. A particularly desirable molten salt electrolyte is a three-component system of aluminum halide, e.g., $AlCl_3$, and two different alkali metal halide salts, e.g., NaCl, KCl.

The battery of this invention would have an aluminum anode and a cathode of halogen on carbon or other inert material immersed in the molten salt electrolyte. For this cell the half-cell reactions are:

| | |
|---|---|
| Anodic half-cell reaction | $Al \rightarrow Al^{+3} + 3e$ |
| Cathodic half-cell reaction | $3/2\ X_2 + 3e^- \rightarrow 3X^-$ |
| Overall | $Al + 3/2\ X_2 \rightarrow AlX_3$ | where $X_2$ is the halogen molecule and $X^-$ is the halide ion. For the preferred halogen, chlorine, the theoretical energy density of the cell would be about 600-watt hours per pound of battery.

The molten electrolyte of the battery is the unique feature of this invention. Any molten or fused salt which is electrolytically conductive may be employed as an electrolyte. It need not correspond to any of the materials used in the electrodes. However, concentration polarization is increased if the fused salt electrolyte does not correspond to the materials produced by the electrode reaction. Therefore, the electrolyte should be composed of the ions produced by such reaction. This may be explained as follows using as an example considerations at the halogen electrode.

For the halogen electrode chlorine the potential is a function of the chlorine pressure and the chloride ion concentration and is expressed by the equation: $E_{Cl_2} = E° + RT/2F \log [(Cl^-)^2/P_{Cl_2}]$ where $E_{Cl_2}$ is the potential in volts at open circuit, $E°$ is the standard potential of chlorine, $R$ is the gas law constant in joules/mole °C., $T$ is the temperature in degrees Kelvin, $F$ is faradays, $Cl^-$ is the pressure of the chlorine gas. At constant pressure the potential of the chlorine electrode is as follows: $E_{Cl_2} = E°' + RT/F \log (Cl^-)$ where $E°$ is a new constant incorporating the pressure factor.

The polarization of an electrode is defined as the difference in voltage between the electrode at zero current under equilibrium conditions and that voltage exhibited under a load, i.e., current. Polarization of electrodes results in decreased efficiency of cell operation. The concentration polarization of the chlorine electrode, i.e., polarization due to a buildup of chloride ion concentration at the electrode-electrolyte interface, in the absence of other sources of polarization such as activation polarization is expressed as follows:

$\eta = E_2 - E_1 = RT/F \log (Cl^-)_2/(Cl^-)_1$ where $\eta$ is the concentration polarization in volts, $E_2$ is the potential at a given current density, $E_1$ is the potential at open circuit, $(Cl^-)_2$ is the chloride ion concentration at the electrode at a given current density and $(Cl^-)_1$ is the chloride ion concentration at open circuit, i.e., no-load conditions.

If $(Cl^-)_1$ is very small, as would be the case where the chloride ion concentration in the electrolyte is low or essentially negligible, the increase in chloride ion concentration $(Cl^-)_2$ resulting from the cathodic production of chloride ions would result in a polarization that is proportional to the log of the ratio of $(Cl^-)_2/(Cl^-)_1$. The smaller the original chloride ion concentration, $(Cl^-)_1$, the larger the ratio for a given current density and the larger the polarization. The larger the original chloride ion concentration, the smaller the ratio (which approaches one as a limit) thereby resulting in smaller polarization values. Similar considerations hold for other halogens and polarization at the aluminum anode. Therefore, to decrease polarization and increase efficiency of all operations, the molten salt electrolyte should be composed of ions which are products of cell discharge reaction, e.g., aluminum and chloride ions. For further theoretical consideration see "The Kinetics of Electrode Reactions," by J. N. Agar and F. Y. Bowden, Proceedings of Royal Society, Vol. A169, Page 206 et. seq. (1938).

As previously discussed, to be suitable for the batteries of this invention, the molten salt electrolyte must be composed of, or at least contain, ions which are products of the cell discharge reaction. In the case of the aluminum-halogen battery, the molten salt electrolyte would be $AlX_3$, where X is the halide ion. Unfortunately, this compound is a very poor electrolytic conductor in the molten state. This is attributed to the fact that the aluminum halides are covalent rather than ionic compounds. For example, the specific resistivity of $AlCl_3$ in ohm-cm. at its melting point is about 2,000,000. Thus, an aluminum-chlorine battery could not be operated using molten $AlCl_3$ as the electrolyte in the same manner as, for example, a lithium-chlorine battery utilizing a molten LiCl electrolyte which has a specific resistivity in ohm-cm. at its melting point of 0.17.

However, it has been found that when an aluminum above-named salt, e.g., $AlCl_3$, is used in conjunction with an alkali metal halide, e.g., KCl, NaCl, an electrolyte can be formed which is highly conductive and which in addition has a melting point considerably lower than that of the aluminum halide itself.

It is thought that the conductivity of the aluminum halide salt is increased due low-speed complexation of that salt with the alkali metal salt. As an example, complexation of $AlCl_3$ with KCl would proceed in the following manner:

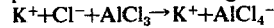
$$K^+ + Cl^- + AlCl_3 \rightarrow K^+ + AlCl_4^-$$

The percentage of the alkali metal halide in a mixture with the aluminum halide may vary from very small amounts to very large amounts with an attendant effect on the conductivity of the electrolyte. For example, the specific resistivity of $AlCl_3$ may be decreased from its high specific resistivity by the addition of only a minor amount of KCl. The conductivity of the fused salt electrolyte is effected by the temperature, but only slightly. The amount of alkali metal halide in the aluminum halide is the major factor in increasing conductance. It is preferable, however, to employ the alkali metal halide in combination with the aluminum halide in proportions such that the mixture is electrically conductive while having a melting point lower than the melting point of its constituents. Such combination would be an electrolyte of good conductivity, which would be utilized at relatively low temperatures.

The effect of the alkali metal halide in lowering the melting point of aluminum halide is illustrated in phase diagrams of the binary systems $NaCl-AlCl_3$ and $KCl-AlCl_3$ published in J. Phys. Chem. (U.S.S.R.)Vol. 14, p. 254 (1940). Although any composition of fused salts can be used as long as it is electrically conductive and liquid, it is advantageous to utilize a salt composition which has a melting point near or below the melting point of its constituents. In the case of an electrolyte of NaCl and $AlCl_3$, it is preferable that the composition fall within the range of 50 to 70 mole % $AlCl_3$ and 50 to 30 mole % NaCl. In the case of an electrolyte of KCl and $AlCl_3$ it is preferable that the composition fall within the range 60 to 80 mole % $AlCl_3$ and 40 to 20 mole % KCl. Of course, it is most preferable to operate these systems near their eutectic points, which in the case of an $NaCl-AlCl_3$ is about 63 mole % $AlCl_3$ and 37 mole % NaCl and in the case of $KCl-AlCl_3$ systems is about 65 mole % $AlCl_3$ and 35 mole % KCl. All these systems moreover are electrically conductive. The melting point of NaCl is about 800° C., the melting point of KCl is about 775° C. and the melting point of $AlCl_3$ is about 190° C. The eutectic temperature of the $NaCl-AlCl_3$ system is about 110° C. Thus, it can be seen that operating in composition ranges near the eutectic offers the advantage of requiring less energy for that operation.

Although the binary systems described above are suitable electrolytes, it is most preferable to utilize as an electrolyte a fused ternary system of aluminum halide and two different alkali metal halides. The halide of this system would, of course, correspond to the halide produced at the cathode and the alkali metals would be lithium, sodium or potassium. Different systems would be $AlCl_3$-LiCl-NaCl, $AlCl_3$-LiCl-KCl, $AlBr_3$-LiBr-NaBr, etc. A particularly preferred ternary system is that of $AlCl_3$-NaCl-KCl. With this system electrolytes may be employed which have melting points as low as 70° C. Two phase diagrams of the $AlCl_3$-NaCl-KCl system, one having the $AlCl_3$ constant at about 40 mole percent while varying the other constituent from 0 to 60 mole percent and another having the $AlCl_3$ constant at about 50 mole percent while varying the other constituent from 0 to 50 mole percent can be found in Zeitschrift für anorganische und allgemeine Chemie, Vol. 306, pp. 1–12 1960). Although exhibiting low melting points, the particular advantage of the ternary system is that the low-temperature liquid region is less sensitive to compositional changes than the binary system.

In a ternary system of $AlCl_3$-NaCl-KCl this insensitivity to compositional changes at low temperatures can be observed from the rather low, slowly rising phase lines which separate the liquid region from those regions containing precipitated materials. The mole ratio of the two alkali metal halides, in this case, NaCl and KCl, would remain fairly constant with the aluminum halide portion, here $AlCl_3$, varying. Generally, in a ternary system, the mole percent of the aluminum halide varies from 40 to 70 mole percent with the alkali metal halides making up the remainder of the system and in such mole percentages as to fall within that area of the phase diagram where sharp changes in aluminum halide content at low temperatures, which may result during battery operations, would not produce precipitated material. This would mean, for example, in a fused salt electrolyte utilizing 50 mole % $AlCl_3$, a KCl content of about 5 to 20 mole percent and a NaCl content of about 30 to 45 mole percent. By simply referring to the phase diagrams of any of the ternary systems encompassed by this invention, any person skilled in the art may determine which compositions most advantageously combine the desired qualities of low-temperature operation and insensitivity to compositional changes.

The resistivity of the low-melting-point binary and ternary systems of aluminum halide and alkali metal halide systems described above is low, usually in the range of 3 to 8 ohm-cm., thus making them suitable electrolytes.

Aluminum as the anode in a battery containing the molten salt electrolyte of aluminum halide and alkali metal halide offers special advantages over other metals. Firstly, aluminum is a relatively active metal from the standpoint of the E.M.F. it can produce. Secondly aluminum exhibits extremely low solubility in molten aluminum salts at temperatures ranging from 423° C. to over 1,000° C. As the preferred compositions of the fused salt electrolyte operate at temperatures well below 400° C., the already low aluminum solubility is further decreased. Furthermore, when the aluminum halide is diluted with salt of an alkali metal, the extent of metal solubility is even further reduced. This is precisely the situation which exists, for example, in the binary melts, $AlCl_3$-KCl, or $AlCl_3$-NaCl and in the ternary melts of $AlCl_3$-KCl-NaCl. Thus, the inherently low solubility of aluminum in its molten salts coupled with the conditions of temperature and electrolyte compositions repress metal dissolution. Consequently, it would be expected that the aluminum-halogen cell would not exhibit self-discharge.

DESCRIPTION OF THE PREFERRED EMBODIMENTS

Example

A battery was prepared having an anode of an aluminum sheet one-sixteenth inch thick, a cathode of a combination of sintered carbon and polytetrafluorethylene (Teflon). The cathodic reactant was chlorine and the electrolyte was 50 mole % $AlCl_3$, 35 mole % NaCl and 15 mole % KCl. The cell was operated at a temperature of 170° C. at which point the electrolyte was a molten salt. Current was drawn from the battery and cell voltage and power density measured. Several different currents were impressed upon the battery and the results of such tests are reported in the table below. Voltage and power as a function of current density are reported.

TABLE

| Current Density Milliamps/cm.² of Electrodes | Cell Voltage (volts) | Power Density Milliwatts/cm.² of Electrode |
| --- | --- | --- |
| 0 | 1.74 | 0 |

| | | |
|---|---|---|
| 5 | 1.74 | 9 |
| 10 | 1.72 | 17 |
| 25 | 1.60 | 40 |
| 50 | 1.54 | 77 |
| 65 | 1.53 | 100 |

The results of the table above indicate that the Al-Cl$_2$ battery is effective at only moderately high temperatures.

The principal advantages offered by an aluminum-halogen battery are its relatively high storage capacity (600 watt hours/lb. of battery) and its relatively low operating temperatures (about 70° to 170° C.). Other cells such as the lithium-chlorine battery have a higher storage capacity; however, the operating temperatures are relatively high (about 650° C.) which bring attendant problems in startup procedures and in battery material stability.

What is claimed is:

1. The method of generating electric power in a secondary cell comprising the steps of providing said cell with solid aluminum metal anode, a gaseous halogen cathode, and a fused salt electrolyte having a melting point below about 170° C., said electrolyte consisting essentially of molten halide salts of at least two metals, one metal being an alkali metal and another metal being aluminum, said halide being the ion of the halogen in the cathode, the electrolyte containing the same halide and halogen in all instances; and, electrochemically reacting, at a temperature below about 170° C., said aluminum anode and said halogen to generate electric power.

2. The method of claim 1 wherein the electrolyte contains in addition a halide salt of a alkali metal.

3. The method of claim 2 wherein the halides are chlorides and the halogen is chlorine.

4. The method of claim 2 wherein the electrolyte is a molten salt of NaCl, KCl and AlCl.

5. The method of claim 1 wherein the halide is chloride and the halogen is chlorine.

6. The method of claim 5 wherein the electrolyte is a molten salt of NaCl and AlCl$_3$.

7. The method of claim 5 wherein the electrolyte is a molten salt of KCl and AlCl$_3$.

8. The method of claim 5 wherein the electrolyte is a molten salt of AlCl and AlCl$_3$.

* * * * *

UNITED STATES PATENT OFFICE
CERTIFICATE OF CORRECTION

Patent No. U.S. 3,632,448        Dated January 4, 1972

Inventor(s) Morton Beltzer

It is certified that error appears in the above-identified patent and that said Letters Patent are hereby corrected as shown below:

In Claim 2, column 6, line 9, before "alkali metal" insert -- different --.

In Claim 4, line 13, "AlCl" should read -- $AlCl_3$ --.

In Claim 8, line 22, "AlCl" should read -- LiCl --.

Signed and sealed this 11th day of July 1972.

(SEAL)
Attest:

EDWARD M. FLETCHER, JR.
Attesting Officer

ROBERT GOTTSCHALK
Commissioner of Patents